(12) United States Patent
Gravel

(10) Patent No.: US 6,673,325 B2
(45) Date of Patent: Jan. 6, 2004

(54) INCINERATION OF WASTE ORGANIC AEROSOLS

(75) Inventor: Jean J. O. Gravel, Hull (CA)

(73) Assignee: Biothermica Technologies Inc., Montréal (CA)

( * ) Notice: Subject to any disclaimer, the term of this patent is extended or adjusted under 35 U.S.C. 154(b) by 23 days.

(21) Appl. No.: 10/133,659

(22) Filed: Apr. 29, 2002

(65) Prior Publication Data

US 2003/0202928 A1 Oct. 30, 2003

(51) Int. Cl.[7] ............................................. B01D 53/00
(52) U.S. Cl. .................... 423/210; 423/245.3; 588/205; 588/228; 588/230
(58) Field of Search .............................. 423/210, 245.3; 588/205, 228, 230

(56) References Cited

U.S. PATENT DOCUMENTS

| | | | |
|---|---|---|---|
| 3,870,474 A | | 3/1975 | Houston ..................... 423/210 |
| 4,470,806 A | | 9/1984 | Greco ......................... 432/182 |
| 5,134,945 A | * | 8/1992 | Reimlinger et al. ........ 110/304 |
| 5,453,259 A | * | 9/1995 | D'Souza .................. 423/245.1 |
| 5,888,063 A | * | 3/1999 | Scott et al. ................. 432/181 |
| 6,183,707 B1 | * | 2/2001 | Gosselin et al. ............ 423/210 |

* cited by examiner

Primary Examiner—Stanley S. Silverman
Assistant Examiner—Maribel Medina
(74) Attorney, Agent, or Firm—Robic

(57) ABSTRACT

A process for treating a waste gas containing condensable organic compounds in the form of an aerosol of liquid particles, in a regenerative thermal oxidation system comprising a combustion chamber and at least two regenerators. During a first period of time, the waste gas is directed through a first one of the regenerators wherein the waste gas is heated by contact with a packing material contained therein, then through the combustion chamber wherein oxidation of the organic compounds contained in the waste gas is achieved and finally through a second regenerator wherein the oxidized gas coming from the combustion chamber is cooled by contact with a packing material contained in the second regenerator, such a contact causing simultaneous heating of the packing material contained in the second regenerator. The oxidized gas which leaves the second regenerator is then purified and may be discharged to the atmosphere. During a second period of time, the waste gas is directed through the second regenerator, then through the combustion chamber and finally through the first regenerator prior to discharging it in a purified form to the atmosphere. This process is improved in that the temperature of the waste gas is increased prior to introducing it into the first regenerator during the first period of time or into the second regenerator during the second period of time by mixing it with a stream of purified gas obtained by the process. As a result, a complete evaporation of all the liquid particles contained in the waste gas is achieved.

10 Claims, 6 Drawing Sheets

INCINERATION OF WASTE ORGANIC AEROSOLS

FIELD OF THE INVENTION

The present invention is directed to a process for the treatment by incineration of ventilation air or waste gases (hereinafter called only "waste gases") containing toxic or odorous fumes of condensable organic compounds in the form of an aerosol of liquid particles.

More specifically, the invention is directed to a process of the above type, whereby high levels of destruction of the pollutants are achieved with an improved heat recovery and a substantial reduction in the amount of fouling of the equipment used to carry out the process.

BACKGROUND OF THE INVENTION

In order protect health and environment, it is necessary to eliminate toxic gases and undesirable odourous fumes from the waste gases released from many manufacturing processes, before their discharge to the environment.

A well known process for removing organic impurities present in waste gases consists in processing the fumes through a heating system to achieve total oxidation of the pollutants in a regenerative thermal oxidation system. U.S. Pat. Nos. 3,870,474 and 4,470,806 disclose examples of such systems, which basically comprise a plurality of heat accumulation chambers, called "regenerators", each containing a suitable packing material such as ceramic spheres or nodules, and a combustion chamber connected to the regenerators and in which oxidation of the impurities is carried out.

The known process has the following cycle of operation.

In a first period of time, the waste gas to be treated is forced to flow through one of the regenerators (hereinafter called "first regenerator") where it is heated by contact with the packing material that is contained therein and has previously been heated. Then, the waste gas is forced to flow through the combustion chamber where total oxidation of the fumes takes place. The hot combustion gas generated within the combustion chamber is directed to another one of the regenerators (hereinafter called "second generator) to heat the packing material contained in it, prior to being exhausted to the atmosphere.

In a second period of time, the waste gas is directed through the second regenerator where it is heated, then through the combustion chamber and then back through the first regenerator, in which it is cooled prior to being exhausted. Heat losses are compensated by injection of auxiliary fuel or combustion products from a burner in the combustion chamber.

The above steps are repeated in the very same order to provide continuous flow and treatment of the waste gas through the system, together with a recovery of a substantial amount of the heat contained in said waste gas after oxidation thereof in the combustion of chamber.

Whenever necessary, a third regenerator may be added to purge any waste gas remaining in one or the other of the first and second regenerators, after the period where the waste gas is heated therein and prior to the introduction of hot combustion gas therein.

The above regenerative oxidation process has been used with success for the treatment of waste gases containing volatile organic compounds as gaseous components, like those produced during the preparation, application and drying of organic solvent-based coatings.

However, a number of problems arise when the process as described herein above is applied to the treatment of waste gases containing condensable organic compounds in the form of an aerosol of liquid particles, like those produced by the impregnation of roofing felts with asphalt base coatings. When treating such waste gases by this process, liquid particles are carried into the regenerators and deposited as a liquid film on the inside surfaces of the ducts and packing material contained in the regenerators. Upon reversal of the flow in a regenerator, the soiled surfaces are heated by contact with the hot combustion gas, thereby causing some of the liquid deposits to evaporate and contaminate the otherwise cleaned gas, which causes a substantial reduction in the destruction efficiency of the process. In addition, any portion of the liquid deposits which are not evaporated, remains on the inside surfaces of the ducts and packing material and accumulates during subsequent cycles, thereby causing a runoff of excess liquid in the gas plenums of the regenerators and an increase in the contamination of the exhaust gas. Furthermore, the liquid deposits are slowly distilled in contact with the hot gas, thereby leaving tarry substances on the packing material and the inside surfaces of the regenerators as well as on the valves and ducts. These deposits have been found to impair the operation of the process and, when allowed to accumulate, to ignite and cause severe overheating and damage to mechanical parts of the equipment.

Presently, it is of common practice to periodically remove the deposits by a "bake-out" procedure at elevated temperature which requires interruption of the normal operation of the process for an appreciable period of time, as well as the participation of skilled maintenance labor, and which also involves serious risks of overheating and damage to the equipment.

Various processes have so far been proposed and tested to reduce the costs and risks associated with the treatment of organic aerosol in waste gases, as outlined above:

A first one of these proposed processes consists in removing by filtration the liquid particles contained in the waste gases prior to their introduction into the regenerators. Such a method requires costly equipment, causes high gas pressure losses and generates considerable operating and maintenance costs.

Another process consists in purging the regenerators with a heated stream of the clean gas during each operating cycle. This process which is disclosed and claimed in U.S. Pat. No. 6,183,707 in the name of the same Applicant, has been found to improve the destruction efficiency of the process by evaporation of some of the lighter fractions of the liquid deposits. However, with this process, the heavier fractions of the deposits remain and accumulate, thereby causing a progressive blockage of the open areas in the packing, with a reduction in the flow and exchange of heat in the regenerators. Thus, the heavier fractions of the deposits still have to be removed at regular intervals by the costly "baking-out" procedure as outlined herein above. In addition, heating of the purging stream requires auxiliary fuel, in addition to the heat recovered in the regenerators or from combustion of the volatile organics in the waste gases. In fact, much of the heat content in the waste organics is lost during the bake-out of the deposits.

SUMMARY OF THE INVENTION

The object of the present invention is to provide an improved regenerative thermal oxidation process for treating a waste containing condensable organic compounds in the form of an aerosol of liquid particles, in order to achieve virtually complete destruction of the organic compounds, a high thermal efficiency, an increased availability of the equipment used to carry out the processes and an elimination of the risks of damage due to over heating.

In accordance with the invention, it has been found that the above mentioned process may efficiently be used for the treatment of a waste gas containing organic compounds in the form of an aerosol of condensed liquid particles in equilibrium with a vapor phase, provided that the waste gas is preheated prior to its introduction in the regenerators in such a manner as to evaporate all the liquid droplets of the aerosol into a vapor phase. Such a preheating is best achieved by mixing the waste gas with a stream of the purified gas which is recycled from the process and suitably heated for this purpose.

In a first preferred embodiment of the invention, the recycled stream of purified is heated by mixing it with a stream of gases drawn from the combustion chamber.

In another preferred embodiment of the invention, the recycled stream of purified gas is heated by mixing it with a stream of hot combustion gases coming from a fuel burner partly or wholly fed with combustible liquid separated as liquid droplets from the waste gas before the pre-heating step.

The above transformation of the liquid aerosol contained in the waste gas into a vapor phase, completely eliminates the deposition of liquids in the regenerators and thus eliminates all the related ill-effects on the performance, safety and maintenance requirements of the equipment.

Thus, the invention as broadly claimed hereinafter is directed to an improved process for treating a waste gas containing condensable organic compounds in the form of an aerosol of liquid particles, in a regenerative thermal oxidation system comprising a combustion chamber and at least two regenerators, each regenerator containing a packing material allowing accumulation of heat, each regenerator also having one end in permanent open communication with the combustion chamber that is common to all of the regenerators, each regenerator further having an other end with directing means to allow the waste gas to flow in and out of the regenerator.

This improved process has a cycle of operation comprising:
   a) during a first period of time:
      directing the waste gas through a first one of the regenerators wherein the waste gas is heated by contact with the packing material contained therein; then through the combustion chamber wherein oxidation of the organic compounds contained in the waste gas is achieved; and finally through a second one of the regenerators wherein the oxidized gas coming from the combustion chamber is cooled by contact with the packing material contained therein, such a contact causing simultaneous heating of the packing material contained in the second regenerator, the oxidized gas leaving the second regenerator being purified and then discharged to the atmosphere;
   b) during a second period of time:
      directing the waste gas through the second regenerator, then through the combustion chamber and finally through the first regenerator prior to discharging it in a purified form to the atmosphere, and
   c) repeating steps a) and b) in the very same order to provide continuous flow and treatment of the waste gas through the system, together with a recovery of a substantial amount of the heat contained in the waste gas after oxidation thereof in the combustion of chamber.

The improvement be in that the process comprises the additional step of:
   d) increasing the temperature of the waste gas prior to introducing it into the first regenerator in step a) or into the second regenerator in step b), by mixing this waste gas with a stream of purified gas obtained by the process, whereby a complete evaporation of all the liquid particles contained in the waste gas is achieved.

Preferably, a fuel or combustion gases may be injected into the combustion chamber and mixed with the waste gas so as to raise the temperature of it and thus ensure complete oxidation of the organic compounds contained in this waste gas.

Preferably also, the purified gas exiting from the regenerators may be pressurized prior to discharging one part of it to the atmosphere and recycling another part of it so as to form the heated stream of purified gas used in the above mentioned step d).

As aforesaid, the stream of purified gas used in step d) may be heated by mixing it with hot gases drawn from the combustion chamber.

Alternatively, the stream of purified gas used in step d) may be heated by mixing it with hot gases coming from a burner fired in part or totally with a combustible liquid separated, as liquid droplets, from the waste gas.

In all cases, the waste gas may advantageously be pressurized prior to introducing it into each of the regenerators.

Part of the liquid particles contained in the waste gas may also be separated prior to processing the waste gas, in order to reduce the amount of heat required to achieve complete evaporation of the liquid particles.

Like in the Applicant's prior process described in U.S. Pat. No. 6,183,707, the process according to the invention may also comprise the additional steps of
   during the second period of time:
      directing the waste gas exiting from the combustion chamber through a third regenerator similar in configuration to the first and second regenerators, instead of directing the waste gas through the first regenerator, thereby allowing the first regenerator to be purged of any waste gas accumulated therein during the first period of time, and;
   in a third period of time:
      discharging to the atmosphere through the first regenerator, the waste gas exiting from the combustion chamber while the second regenerator is being purged and the waste gas exiting therefrom is directed to the third regenerator to be heated.

The invention and its advantages will be better understood upon reading the following non restrictive description of examples of regenerative thermal oxidation systems especially devised for carrying out the above mentioned process.

BRIEF DESCRIPTION OF THE DRAWINGS

For the purpose of simplicity, the same reference numerals have been used in all the FIGURES to identify the same structural components.

DETAILED DESCRIPTION OF THE PREFERRED EMBODIMENTS ILLUSTRATED IN THE DRAWINGS

Figure 1:
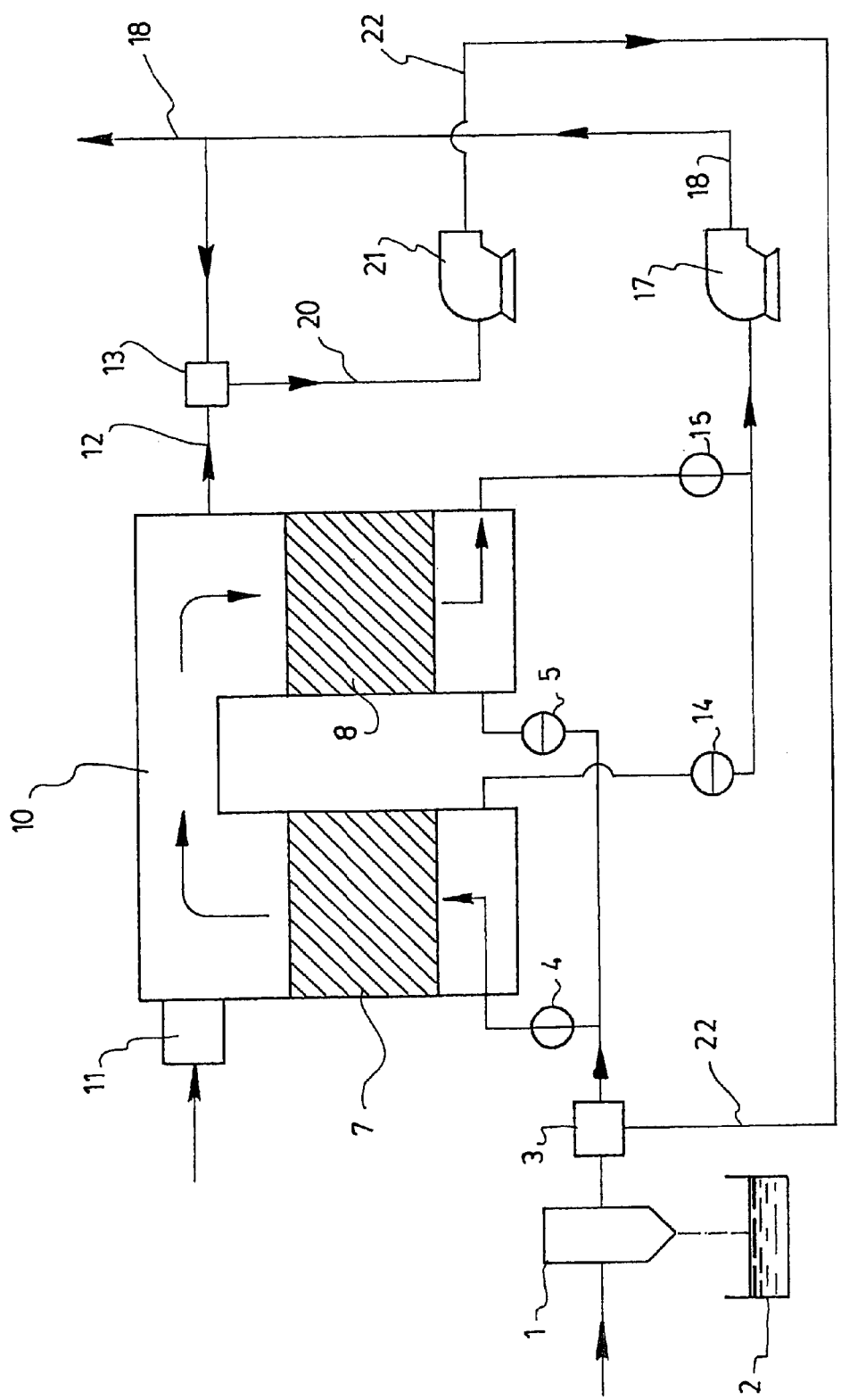
FIG. 1 is a flow diagram of a two-chamber regenerative thermal oxidation system wherein heating of the recycled stream of purified gas is achieved by mixing with a stream of combustion gases, said flow diagram illustrating the gas flow directions in the regenerators during the first period of time of the cycle of operation of the process according to the invention.

FIG. 1 shows a regenerative thermal oxidation system for use to carry out the process according to the invention. This system comprises two packed bed heat accumulation regenerators 7 and 8 having their top portions in open communication with a combustion chamber 10 into which an auxiliary fuel burner 11 supplies a flow of combustion gas to generate the heat required for carrying out the process. A flow of waste gas containing condensable organic compounds in the form of an aerosol of liquid particles (droplets), is fed to the system by a supply duct to a droplet separator 1, typically of the cyclonic type, where some of the droplets are removed from the gas and discharged as a liquid 2. The waste gas containing the remaining part of the aerosol is fed to a mixing chamber 3, wherein it is preheated with a hot stream of recycled clean gas 22, thereby causing complete evaporation of the liquid particles.

In a first period of time, the preheated waste gas is fed to the first regenerator 7 through an open inlet valve 4, where it is heated in contact with a ceramic solid packing forming the packed bed of this first regenerator, prior to being discharged at the top to combustion chamber 10. The waste gas is further heated to cause complete oxidation of the organic vapors contained in the waste gas. Such the heating is achieved by means of the auxiliary fuel burner 11. The hot clean gas that is so obtained is then fed to the second regenerator 8, where it is cooled by contact with the packing therein prior to being discharged to the atmosphere through an open exit valve 15, by means of motor driven blower 17 and a smoke stack 18. A fraction of the cooled cleaned gas in the stack 18 is collected and mixed with a stream 12 of high temperature gases drawn from combustion chamber 10 so as to produce a stream of heated recycled clean gas 20 which is fed by a motor driven blower 21 and conduit 22 to the chamber 3, where it is mixed with the waste gas as outlined above. FIG. 1 illustrates the flow directions in the regenerators during this first period of time.

Figure 2:
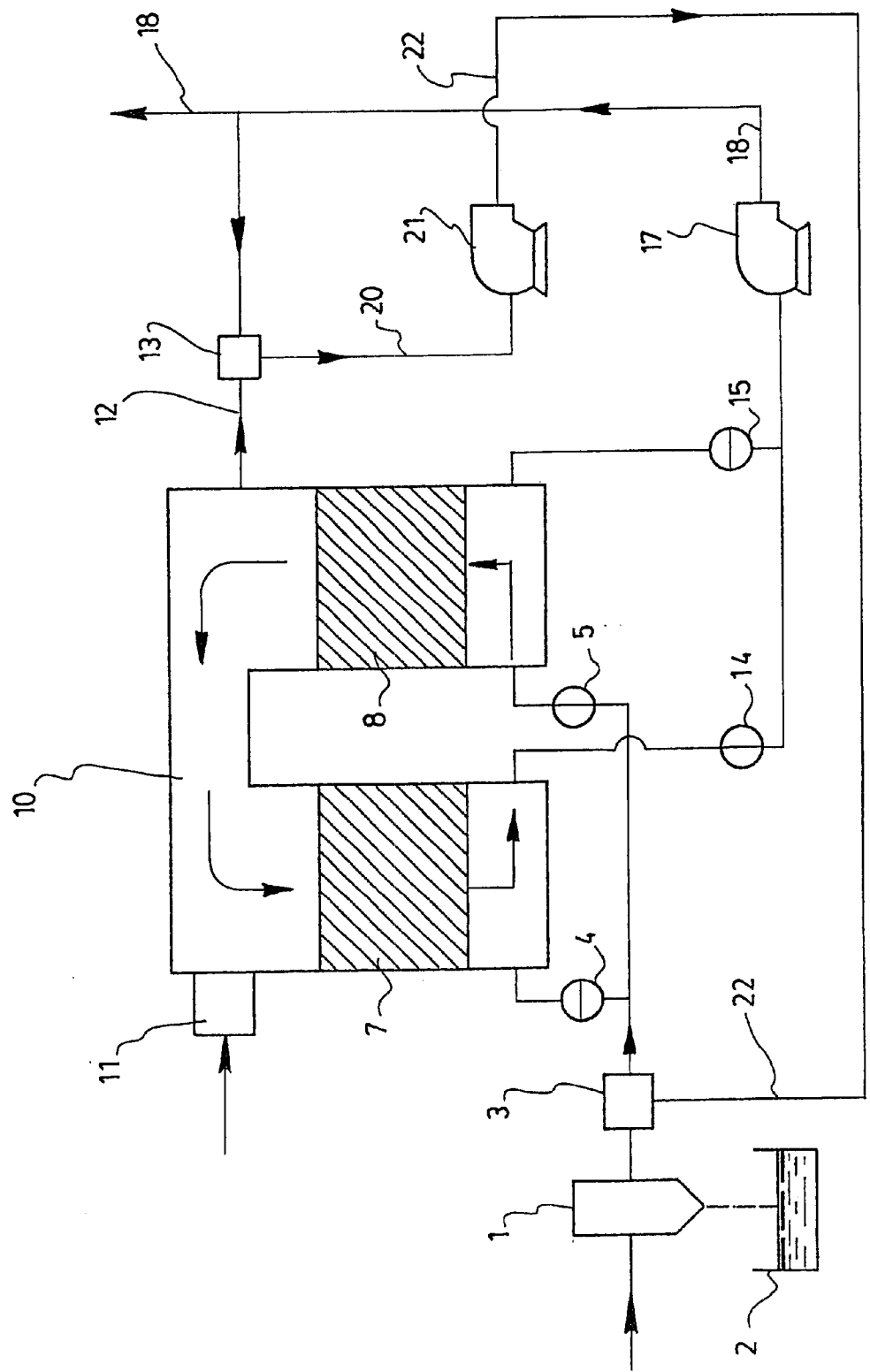
FIG. 2 is a flow diagram similar to the one of FIG. 1, illustrating the gas flow directions during the second period of time of the cycle of operation of the process.

FIG. 2 shows the same system as in FIG. 1, but with the flow directions in the regenerators during the second period of time. From a practical stand-point, the operation of the system during this second period of time is similar to the one described above in connection with FIG. 1.

Figure 3:
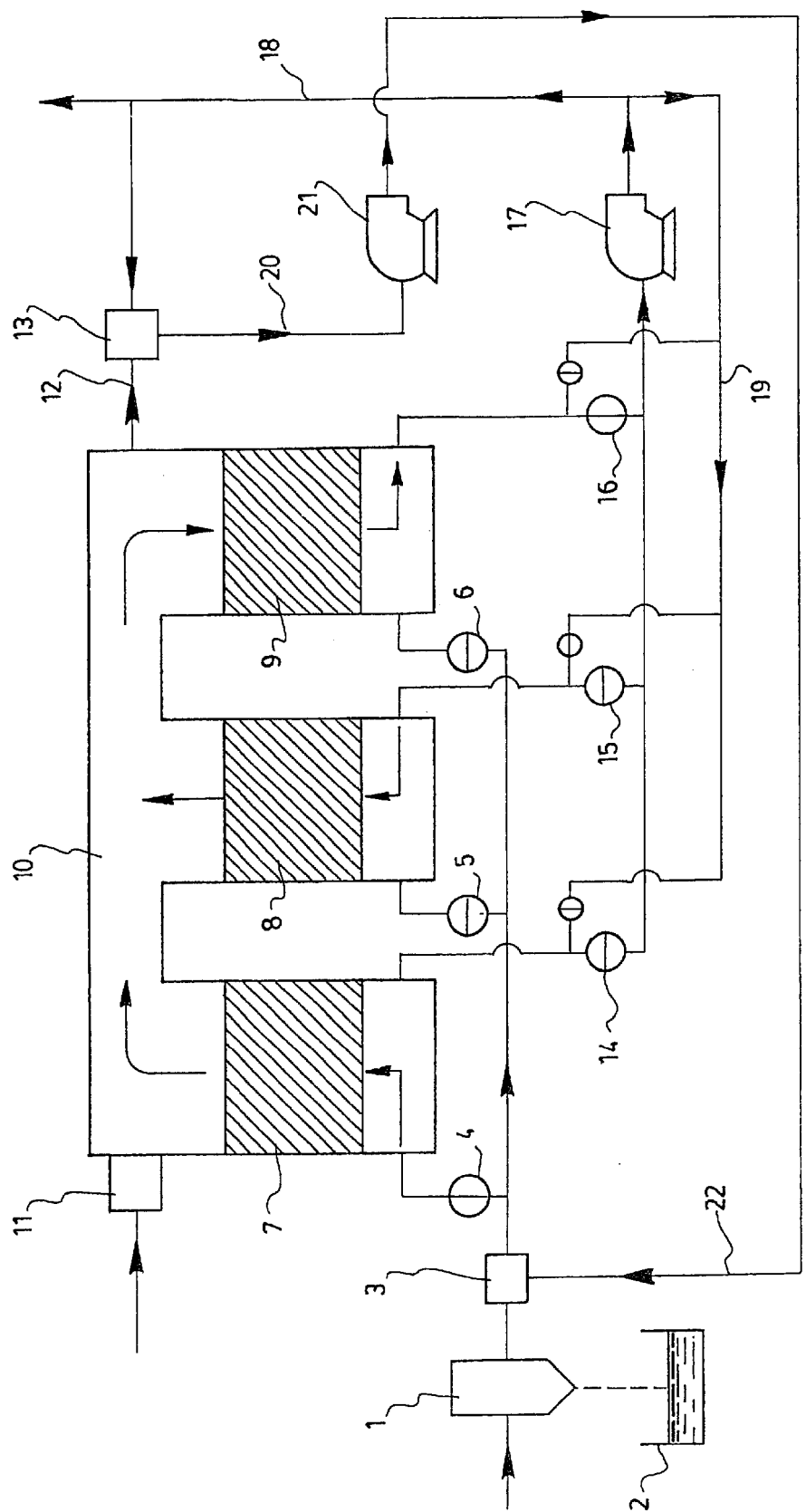
FIG. 3 is a flow diagram of a three-chamber regenerative thermal oxidation system wherein heating of the recycled stream of purified gas is achieved by mixing with a stream of combustion gases, said flow diagram illustrating the gas flow directions in the regenerators during the first period of time of the cycle of operation of the process according to the invention.

FIG. 3 shows another system for use to carry out the process according to the invention. This system comprises three regenerators 7, 8 and 9. The waste gas to be supplied to the regenerators passes through a droplet separator 1 and then through a mixing chamber 3 where it is heated by mixing with a stream of heated recycled clean gas 22. During a first period of time, the heated waste gas is supplied to the first regenerator 7 where it is heated by contact with the packing contained in said first regenerator prior to being fed to the combustion chamber 10 where it is further heated by addition of heat supplied by an auxiliary fuel burner 11, to a temperature sufficient to achieve complete oxidation of the waste organic compounds. The clean gas is then fed to the third regenerator 9 where it is cooled prior to being discharged to the atmosphere through an open valve 16 by means of a motorized blower 17 and a smoke stack 18. A small fraction of the cleaned cooled gas is drawn through a duct 19 and fed to the second regenerator 8 to purge it of any waste gas remaining therein from the previous period, prior to the following period of discharge of clean gas. The gas purged out of the second regenerator 8 is fed to the combustion chamber 10 so as to be oxidized together with the main stream of waste gas.

Figure 4:
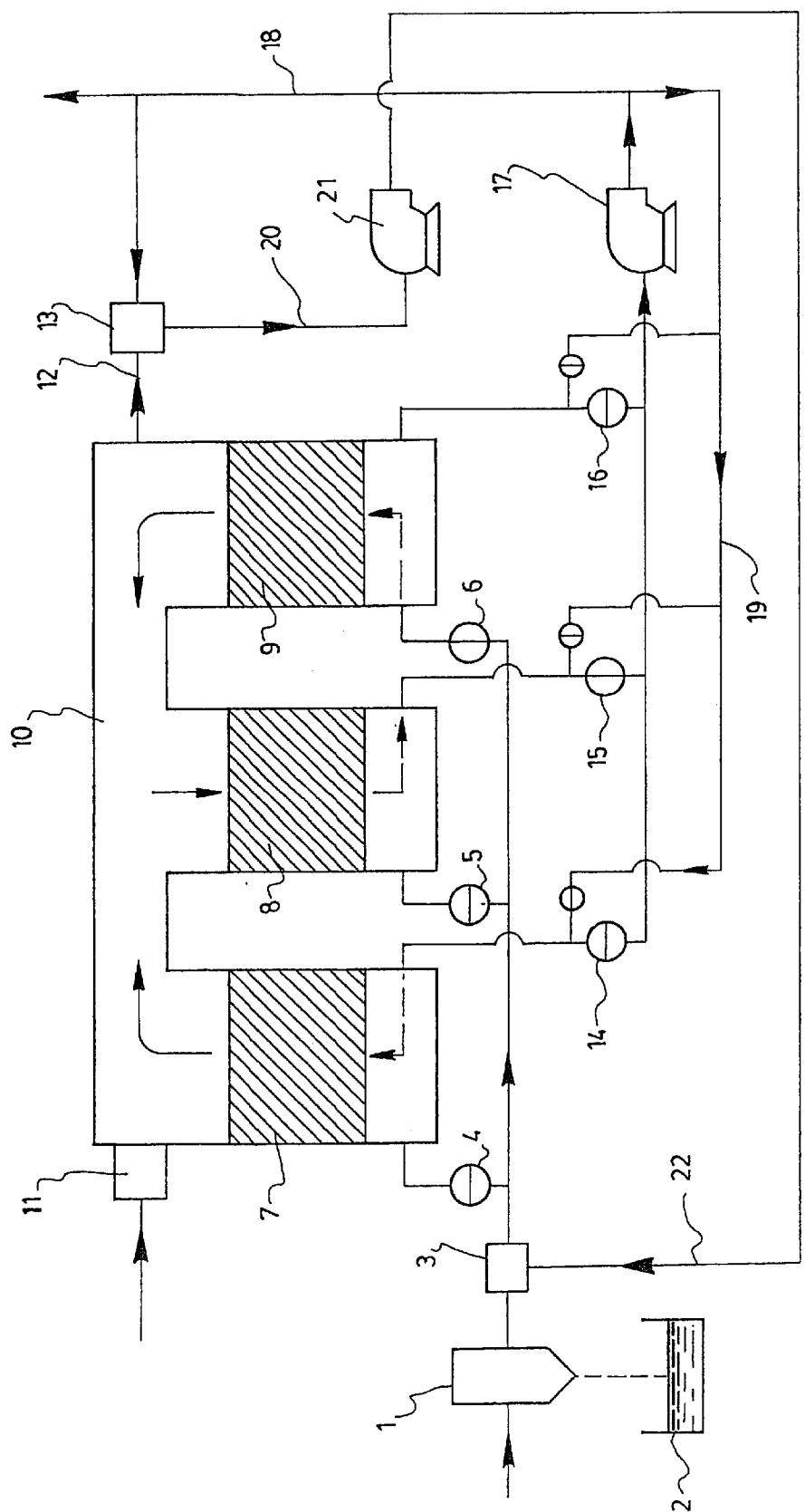
FIG. 4 is a flow diagram similar to the one of FIG. 3, illustrating the gas flow directions during the second period of time of the cycle of operation of the process.

FIG. 4 shows the same system as in FIG. 3 but with the flow directions in the regenerators during a second period of time. As is shown in this FIG. 4, the valves are then positioned in such a manner as to feed the waste gas to the third regenerator 9, while the clean gas is discharged through second regenerator 8 and the purging gas is fed to the first regenerator 7.

In a third period of time, the waste gas is fed to the second regenerator 8, while the clean gas is discharged through the first regenerator 7 and the purging gas is fed to third regenerator 9. This sequence is repeated at regular intervals to provide an uninterrupted flow of waste gas through the whole system.

The destruction efficiency within this system is somewhat higher than that of the two-regenerator system described above, due to the purging step.

Figure 5:
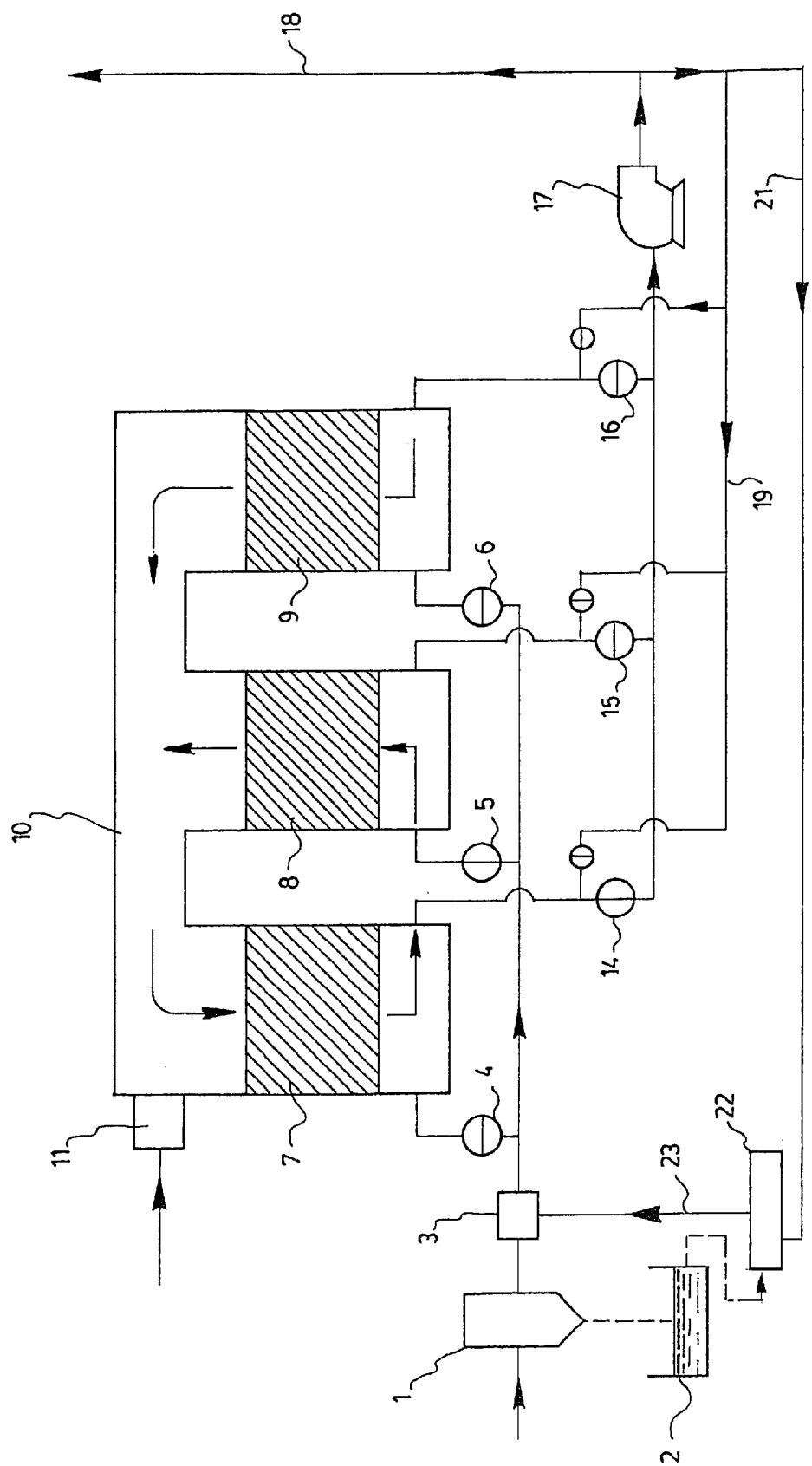
FIG. 5 is a flow diagram of a three-chamber regenerative oxidation system similar to that in FIG. 3 but where heating of the recycled stream of purified gas stream is achieved by means of a burner fed partly or totally with liquid separated from the waste gas, said flow diagram illustrating the gas flow directions as during the third period of time of the cycle of operation of the process.

FIG. 5 shows yet another system for use to carry out the process according to the invention, wherein the recycled clean gas stream 21 used for preheating the waste gas, is heated by means of an auxiliary fuel burner 22 supplied partly or totally with organic liquids 2 removed from the waste gas by means of the separator 1. This method of heating the recycled gas is also applicable to the two-regenerator system shown in FIGS. 1 and 2.

Figure 6:
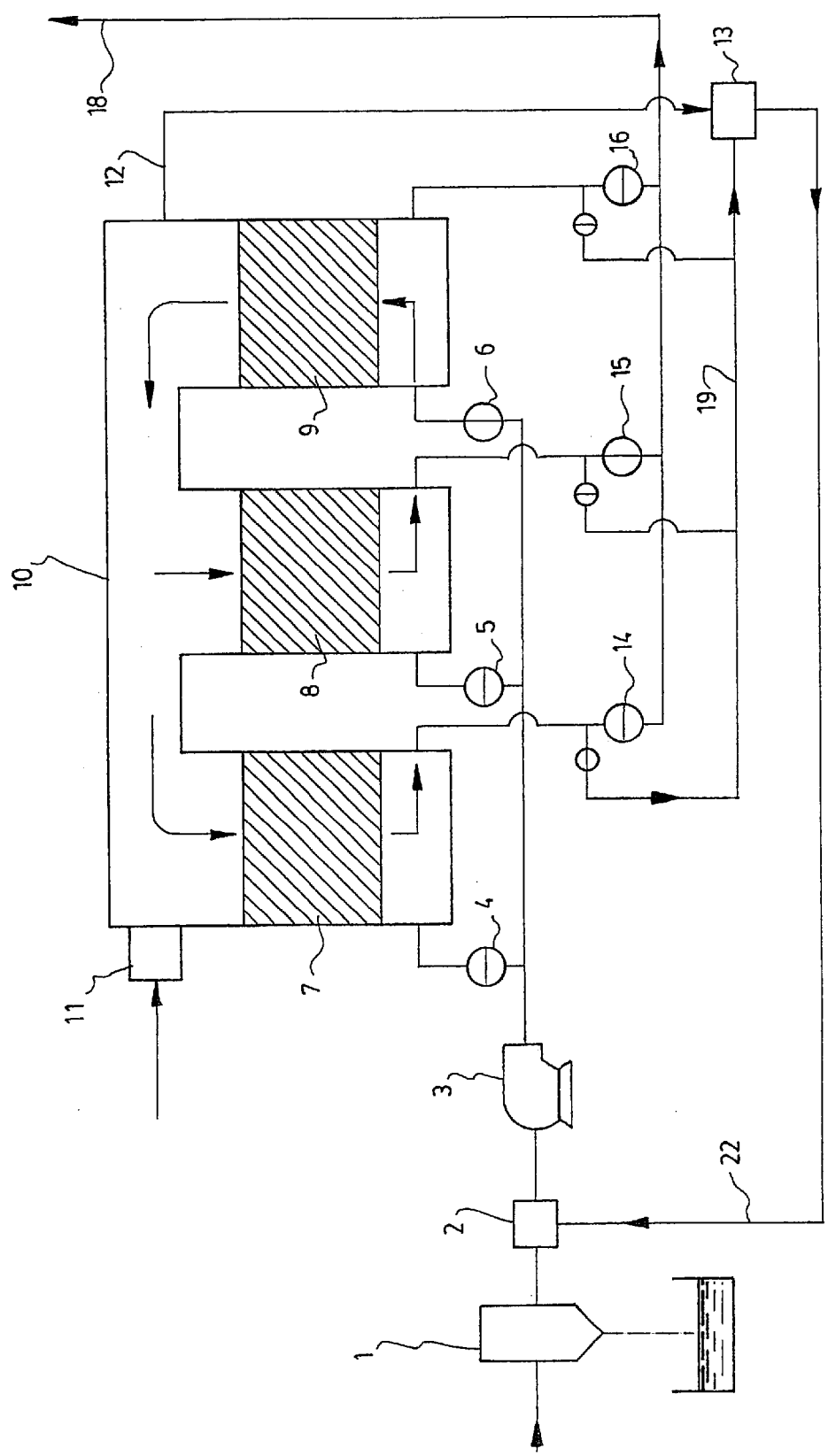
FIG. 6 is a flow diagram of a three-chamber regenerative oxidation system similar to the one shown FIG. 3 but with a motorized blower located in the supply duct connected to the regenerators.

FIG. 6 shows a further system for use to carry out the present invention. This further system is similar to that in FIG. 3, except for the position of the motorized blower. As is shown the waste gas is supplied to the regenerators through the droplet separator 1 and the mixing chamber 2 by means of motorized blower 3. The sequence of flow through the three regenerators is as shown in FIGS. 3, 4 and 5 above except for the direction of flow of the purging gas which is discharged from the regenerator 7 being purged, through a conduit 19 to a mixing chamber 13 where it is heated in contact with combustion gases 12 from combustion chamber 10. Heated recycled gas from the mixing chamber 13 is fed through a duct 22 to the mixing chamber 2 in order to preheat the waste gas.

In summary, the present invention as broadly disclosed hereinabove and illustrated in the preferred embodiments shown in the drawings is directed to a process of oxidation of waste gases containing organic compounds in the form of vapors, liquid droplets and aerosols, in which the waste compounds recovered during operation of the process are totally used for heating purpose, thereby reducing to a minimum the requirements for auxiliary fuel and eliminating operating problems due to a fouling of the equipment with waste liquids.

What is claimed is:

1. In a process for treating a waste gas containing condensable organic compounds in the form of an aerosol of liquid particles, in a regenerative thermal oxidation system comprising a combustion chamber and at least two regenerators, each of said regenerators containing a packing material allowing accumulation of heat, each said regenerators also having one end in permanent open communication with the combustion chamber that is common to all of said regenerators, each of said regenerators further having an other end with directing means to allow gases to flow in and out of said regenerator, said process having a cycle of operation comprising:

a) during a first period of time:
   directing the waste gas through a first one of said regenerators wherein said waste gas is heated by contact with the packing material contained therein; then through the combustion chamber wherein oxidation of the organic compounds contained in said waste gas is achieved; and finally through a second one of said regenerators wherein the oxidized gas coming from the combustion chamber is cooled by contact with the packing material contained in said second regenerator, such a contact causing simultaneous heating of the packing material contained in the second regenerator, the oxidized gas leaving said second regenerator being purified and then discharged to the atmosphere;

b) during a second period of time:
   directing the waste gas through the second regenerator, then through the combustion chamber and finally through the first regenerator prior to discharging it in a purified form to the atmosphere, and c) repeating steps a) and b) in the very same order to provide continuous flow and treatment of said waste gas through the system, together with a recovery of a substantial amount of the heat contained in said waste gas after oxidation thereof in the combustion of chamber, the improvement wherein said process also comprises:

d) increasing the temperature of the waste gas prior to introducing it into the first regenerator in step a) or into the second regenerator in step b), by mixing said waste gas with a stream of purified gas obtained by the process, whereby a complete evaporation of all the liquid particles contained in the waste gas is achieved.

2. The improved process of claim 1, further comprising:

e) injecting a fuel or combustion gases into the combustion chamber and mixing said fuel or combustion gases with the waste gas so as to raise the temperature of said waste gas and thus ensure complete oxidation of the organic compounds contained in said waste gas.

3. The improved process of claim 1, further comprising:

f) pressurizing the purified gas exiting from the regenerators prior to discharging one part of it to the atmosphere and recycling another part of said purified gas so as to form said stream of purified gas used in step d).

4. The improved process of claim 1, further comprising:

g) pressurizing the waste gas prior to introducing it into each of said regenerators.

5. The improved process of claim 1, wherein:

h) during the second period of time:
   directing the waste gas exiting from the combustion chamber through a third regenerator similar in configuration to the first and second regenerators, instead of directing said waste gas through the first regenerator, thereby allowing said first regenerator to be purged of any waste gas accumulated therein during the first period of time, and;

i) during a third period of time:
   discharging to the atmosphere through said first regenerator, the waste gas exiting from the combustion chamber while the second regenerator is being purified and the waste gas exiting therefrom is being directed to the third regenerator.

6. The improved process of claim 1, further comprising:

j) separating from the waste gas part of the liquid particles contained therein prior to processing said waste gas in order to reduce the amount of heat required to achieve evaporation of the liquid particles remaining in said waste gas.

7. The improved process of claim 1, wherein, in step d), the stream of purified gas is heated by mixing said stream with hot combustion gases supplied by a fuel burner fed in part or totally with combustible liquid separated from said waste gas.

8. The improved process of claim 1, wherein, in step d), the stream of purified gas is heated by mixing said stream with hot gases drawn from the combustion chamber.

9. The improved process of claim 5, further comprising:

separating from the waste gas part of the liquid particles contained therein prior to processing said waste gas in order to reduce the amount of heat required to achieve evaporation of the liquid particles remaining in said waste gas, and wherein, in step d), the stream of purified gas is heated by mixing said stream with hot gases supplied by a burner fired in part or totally with combustible liquid separated from said waste gas.

10. The improved process of claim 5, further comprising:

separating from the waste gas part of the liquid particles contained therein prior to processing said waste gas in order to reduce the amount of heat required to achieve evaporation of the liquid particles remaining in said waste gas, and wherein, in step d), the stream of purified gas is heated by mixing said stream with hot gases drawn from the combustion chamber.

* * * * *